(12) United States Patent
Gorobinskiy et al.

(10) Patent No.: US 7,838,159 B2
(45) Date of Patent: Nov. 23, 2010

(54) REFORMER FOR FUEL CELL, AND FUEL CELL SYSTEM INCLUDING SAME (75) Inventors: Leonid Gorobinskiy, Yongin-si (KR); Ju-Yong Kim, Yongin-si (KR); Jin-Kwang Kim, Yongin-si (KR); Dong-Myung Suh, Yongin-si (KR); Jin-Goo Ahn, Yongin-si (KR); Dong-Uk Lee, Yongin-si (KR); Sung-Chul Lee, Yongin-si (KR); Man-Seok Han, Yongin-si (KR); Chan-Ho Lee, Yongin-si (KR); Yong-Kul Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 623 days.

(21) Appl. No.: 11/852,631

(22) Filed: Sep. 10, 2007

(65) Prior Publication Data
US 2008/0063911 A1 Mar. 13, 2008

(30) Foreign Application Priority Data
Sep. 11, 2006 (KR) ...................... 10-2006-0087313

(51) Int. Cl.
*H01M 8/06* (2006.01)
*B01J 8/04* (2006.01)
(52) U.S. Cl. ...................... 429/412; 429/423; 422/190
(58) Field of Classification Search ............. 429/19, 429/20, 412, 423; 422/189, 190
See application file for complete search history.

(56) References Cited
U.S. PATENT DOCUMENTS

| | | | |
|---|---|---|---|
| 2003/0143443 A1 | 7/2003 | Tsang et al. | |
| 2004/0037757 A1 | 2/2004 | Taguchi et al. | |
| 2004/0048114 A1 * | 3/2004 | Shore | 429/19 |
| 2004/0241509 A1 * | 12/2004 | Taguchi et al. | 429/19 |
| 2006/0099489 A1 | 5/2006 | Kwak et al. | |

FOREIGN PATENT DOCUMENTS

| | | |
|---|---|---|
| CN | 1551397 | 12/2004 |
| EP | 1479650 | 11/2004 |
| JP | 2000-285949 | 10/2000 |

(Continued)

OTHER PUBLICATIONS

Office Action issued in corresponding European Patent Application No. 07115262.3 dated Apr. 29, 2008.

(Continued)

*Primary Examiner*—Stephen J. Kalafut
(74) *Attorney, Agent, or Firm*—Knobbe Martens Olson & Bear LLP (57) ABSTRACT

The reformer for a fuel cell system includes a reforming reaction part that generates hydrogen gas from a fuel through a catalyst reforming reaction using heat energy, and a carbon monoxide reducing part that reduces the concentration of carbon monoxide in the hydrogen gas, through an oxidizing reaction of hydrogen gas with the oxidant. The carbon monoxide reducing part includes a first reducing part including a first carbon monoxide oxidizing catalyst and a second reducing part including a second carbon monoxide oxidizing catalyst.

21 Claims, 3 Drawing Sheets

FOREIGN PATENT DOCUMENTS

| | | |
|---|---|---|
| JP | 2002-234707 | 8/2002 |
| KR | 2007-36451 | 4/2007 |
| WO | WO 03/080238 | 11/2003 |
| WO | WO 2004/022481 | 3/2004 |

OTHER PUBLICATIONS

Park, J. et al., "Selective oxidation of CO in hydrogen-rich stream over Cu-Ce catalyst promoted with transition metals", International Journal of Hydrogen Energy, vol. 30, No. 2, Feb. 2005, pp. 209-220.

Marino, F. et al., "Supported base metal catalysts for the preferential oxidation of carbon monoxide in the presence of excess hydrogen (PROX)", Applied Catalysis B: Environmental, Jun. 28, 2005 pp. 175-183.

Liu, Y. et al., "Preferential oxidation of CO in $H_2$ over $CuO-CeO_2$ catalysts", Catalysis Today, vol. 93-95, Sep. 2004, pp. 241-246.

U.S. Appl. No. 11/751,942, filed May 22, 2007, Gorobinskiy et al., Samsung SDI Co., Ltd.

* cited by examiner

REFORMER FOR FUEL CELL, AND FUEL CELL SYSTEM INCLUDING SAME

CROSS-REFERENCE TO RELATED APPLICATIONS

This application claims the benefit of Korean Application No. 10-2006-0087313, filed Sep. 11, 2006, in the Korean Intellectual Property Office, the disclosure of which is incorporated herein by reference in its entirety.

BACKGROUND OF THE INVENTION

1. Field of the Invention

Aspects of the present invention relate to a reformer for a fuel cell and a fuel cell system including the same. More particularly, aspects of the present invention relate to a reformer having a simplified structure, excellent oxidation activity, and excellent oxidative selectivity.

2. Description of the Related Art

A fuel cell can be used in a power generation system to produce electrical energy through an electrochemical redox reaction of an oxidant and a fuel. A suitable fuel can be hydrogen, or a hydrocarbon-based material, such as methanol, ethanol, natural gas, and the like. Such a fuel cell is a clean energy source that can reduce the demand for fossil fuels. It includes a stack composed of unit cells, and produces various ranges of power output. Since it has a four to ten times higher energy density than a small lithium battery, it has been highlighted as a small portable power source.

Representative exemplary fuel cells include polymer electrolyte membrane fuel cells (PEMFC) and a direct oxidation fuel cells (DOFC). The direct oxidation fuel cells include direct methanol fuel cells that use methanol as a fuel.

The polymer electrolyte fuel cells have a high energy density and a high power output, but also have problems in that they use hydrogen gas as a fuel, which must be carefully handled. In addition, producing hydrogen gas often requires accessory facilities, such as fuel reforming processors for reforming methane, methanol, natural gas, and the like.

On the contrary, a direct oxidation fuel cell has lower energy density than that of a polymer electrolyte fuel cell, but is easier to handle, can operate at a lower operation temperature, and producing its fuel does not require additional fuel reforming processors.

In a fuel cell system, a stack, that includes several to scores of unit cells stacked adjacent to one another, generates electricity. Each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to the anode and is adsorbed on catalysts of the anode, and the fuel is oxidized to produce protons and electrons. The electrons are transferred to the cathode via an external circuit, and the protons are transferred to the cathode through the polymer electrolyte membrane. In addition, an oxidant is supplied to the cathode, and then the oxidant, the protons, and the electrons are reacted on catalysts of the cathode, to produce electricity along with water.

Generally, a fuel cell system is composed of a stack, a reformer, a fuel tank, and a fuel pump. The stack forms a body of the fuel cell system, and the fuel pump moves the fuel from the fuel tank to the reformer. The reformer reforms the fuel to generate hydrogen gas, and supplies the hydrogen gas to the stack.

A reformer generally includes a reforming reaction part that generates hydrogen gas from a fuel, through a catalyst reforming reaction, using heat energy. A fuel cell system generally includes a carbon monoxide reducing part that removes carbon monoxide from the hydrogen gas, through oxidizing reaction that promotes the oxidation of the carbon monoxide over the oxidation of the hydrogen gas. Such a reforming reaction is performed by a reforming catalyst, and therefore, there is currently much research into reforming catalysts.

SUMMARY OF THE INVENTION

One embodiment of the present invention provides a reformer for a fuel cell having a simplified structure and an excellent oxidation activity and selectivity.

Another embodiment of the present invention provides a fuel cell system including the reformer.

According to one embodiment of the present invention, a reformer for a fuel cell system is provided. The reformer includes a reforming reaction part that generates hydrogen gas from a fuel, through a catalyst reforming reaction using heat energy; and a carbon monoxide reducing part that reduces a carbon monoxide concentration in the hydrogen gas, through a oxidizing reaction of the carbon monoxide with the oxidant. The carbon monoxide reducing part includes a first reducing part including a first carbon monoxide oxidizing catalyst, and a second reducing part including a second carbon monoxide oxidizing catalyst.

According to another embodiment, a fuel cell system is provided. The fuel cell system includes the reformer; at least one electricity generating element to generate electrical energy by electrochemical reactions of the hydrogen gas and the oxidant; a fuel supplier to supplying the fuel to the reforming reaction part; and an oxidant supplier to supply the oxidant to the carbon monoxide reducing part, and the electricity generating element, respectively.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of an exemplary embodiment of the present invention will hereinafter be described in detail with reference to the accompanying drawings.

The reformer, according to various embodiments, comprises a reforming reaction part that generates hydrogen gas from a fuel, through a catalyst reforming reaction using heat energy. The hydrogen gas produced in the reformer also contains a carbon monoxide. The carbon monoxide can result from impurities in the fuel, or it can be a byproduct of the hydrogen producing reaction. The reformer also comprises a carbon monoxide reducing part that reduces the concentration of the carbon monoxide in the hydrogen gas, through an oxidizing reaction of the carbon monoxide with an oxidant. The carbon monoxide reducing part comprising a first reducing part comprises a first carbon monoxide oxidizing catalyst, and a second reducing part comprising a second carbon monoxide oxidizing catalyst.

In the carbon monoxide reducing part, a preferential oxidation (PROX) of carbon monoxide occurs. Through the preferential oxidation, the carbon monoxide in the hydrogen gas is reduced to a ppm level. It is necessary to reduce the carbon monoxide content since it poisons fuel cell catalysts, thereby deteriorating electrode performance.

The PROX reaction is facilitated using catalysts. These catalysts selectively oxidize residual carbon monoxide with oxygen in hydrogen gas streams according to the following reaction: $CO + \frac{1}{2}O_2 \rightarrow CO_2$ wherein hydrogen may comprise greater than 60% by volume of the gas stream composition. An undesirable side reaction in this method is therefore the oxidation of hydrogen according to the following reaction: $H_2 + \frac{1}{2}O_2 \rightarrow H_2O$. In order to consume as little hydrogen as possible, the oxidation process is preferably as selective as possible for the oxidation of carbon monoxide. Some of the factors that influence the selectivity of the oxidation process include the composition of the input gas stream used in the process, the reaction temperature, the space velocity of the input gas stream and the composition of the preferential oxidation catalyst.

Platinum-group metals such as Pt, Rh, Ru, and the like, are used for a conventional preferential oxidation process. However, these metals have a low selectivity for carbon monoxide. This low selectivity can lead to the undesirable oxidation of hydrogen into water. That is to say, the platinum-grouped metals have high activity for the oxidation of carbon monoxide, but cause side-reactions that produce water, by reacting hydrogen and an oxidant.

According to one embodiment of the present invention, the carbon monoxide reducing part is divided into a first reducing part and a second reducing part. The first and second reducing parts include different carbon monoxide oxidizing catalysts. Including different carbon monoxide catalysts improves selectivity at high temperatures.

The first reducing part includes a first carbon monoxide oxidizing catalyst having a high selectivity for a carbon monoxide oxidizing reaction, and the second reducing part includes a second carbon monoxide oxidizing catalyst having a high activity for a carbon monoxide oxidizing reaction. The carbon monoxide containing hydrogen gas is supplied to the first carbon monoxide reducing part, to react with the first carbon monoxide oxidizing catalyst, and is then supplied to the second carbon monoxide reducing part, to react with the second carbon monoxide oxidizing catalyst.

A conventional reformer of a fuel cell system includes a carbon monoxide reducing part having a complicated structure to improve selectivity. For example, a conventional carbon monoxide reducing part requires the oxidant to be supplied multiple times, or requires multiple catalytic reactors, or requires the precise control of the speed at which the oxidant is supplied. However, the carbon monoxide reducing part according to embodiments of the present invention does not require multiple oxidant supplies, or multiple catalytic reactors. The carbon monoxide reducing part can improve selectivity of the carbon monoxide oxidizing reaction.

In the first carbon monoxide reducing part and the second carbon monoxide reducing part, a carbon monoxide oxidizing reaction occurs as shown in the below Reaction Scheme 1. In the case that the first carbon reducing part includes the first carbon monoxide oxidizing catalyst, which has higher selectivity for a carbon monoxide oxidizing reaction, the gas that passes through the first carbon monoxide reducing part has a higher oxygen/carbon monoxide ratio. The gas, which has a higher oxygen/carbon monoxide ratio, can improve the activity of the second carbon monoxide oxidizing catalyst.

$$2CO + O_2 \rightarrow 2CO_2 \qquad \text{[Reaction Scheme 1]}$$

The first carbon monoxide oxidizing catalyst includes any catalyst having excellent selectivity for a carbon monoxide oxidizing reaction. According to one embodiment, the first carbon monoxide oxidizing catalyst includes $CeO_2$ and $CuO$. According to another embodiment, first carbon monoxide oxidizing catalyst may include $CeO_2$, MO (MO is an inorganic oxide), and $CuO$. When the first carbon monoxide oxidizing catalyst includes $CeO_2$ and $CuO$, the selectivity for the carbon monoxide oxidizing reaction is increased, and when it includes $CeO_2$, MO, and $CuO$, the selectivity for the carbon monoxide oxidizing reaction is further increased.

With regard to the MO, M is selected from the group consisting of Ni, Co, Fe, Sn, Pb, Se, and combinations thereof. According to one embodiment, Ni is suitable as the M.

The first carbon monoxide oxidizing catalyst may include $CeO_2$ and $CuO$, in a weight ratio of 15-25:1-10. When the weight ratios of the $CeO_2$ and $CuO$ are under the lower limit, the intended catalyst activity cannot be obtained, and when the weight ratios are over the upper limit, catalytic activity may be reduced.

The first carbon monoxide oxidizing catalyst includes the $CeO_2$, MO, and $CuO$, in a weight ratio of 15-25:0.1-0.4:1-10. When the weight ratios of the $CeO_2$, MO, and $CuO$ are under the lower limit, the intended catalytic activity cannot be obtained, and when the weight ratios are over the upper limit, catalytic activity may be reduced.

The first carbon monoxide oxidizing catalyst includes an active material supported on a carrier selected from the group consisting of $Al_2O_3$, $TiO_2$, $SiO_2$, and combinations thereof. According to one embodiment, the active material may be supported on $Al_2O_3$.

The first carbon monoxide oxidizing catalyst, including the active material of $CeO_2$ and $CuO$, or the active material of $CeO_2$, MO, and $CuO$, can be prepared using the following method.

According to various embodiments, a method of preparing the first carbon monoxide oxidizing catalyst, including the active material of $CeO_2$ and $CuO$, will now be described. A Ce precursor is dissolved in a Cu-containing aqueous solution to prepare a mixed solution. In the case when the first carbon monoxide oxidizing catalyst comprises the active material of $CeO_2$, MO, and $CuO$, a cerium precursor, and an M precursor are dissolved in a Cu-containing aqueous solution, to prepare a mixed solution. Herein, when the carbon monoxide oxidizing catalyst is to be supported by a carrier, the carrier is added to the mixed solution. The mixed solution is heated at varying temperatures, and dried, to thereby produce a compound. The compound is then calcinated, resulting in a finished carbon monoxide oxidizing catalyst.

Figure 3:
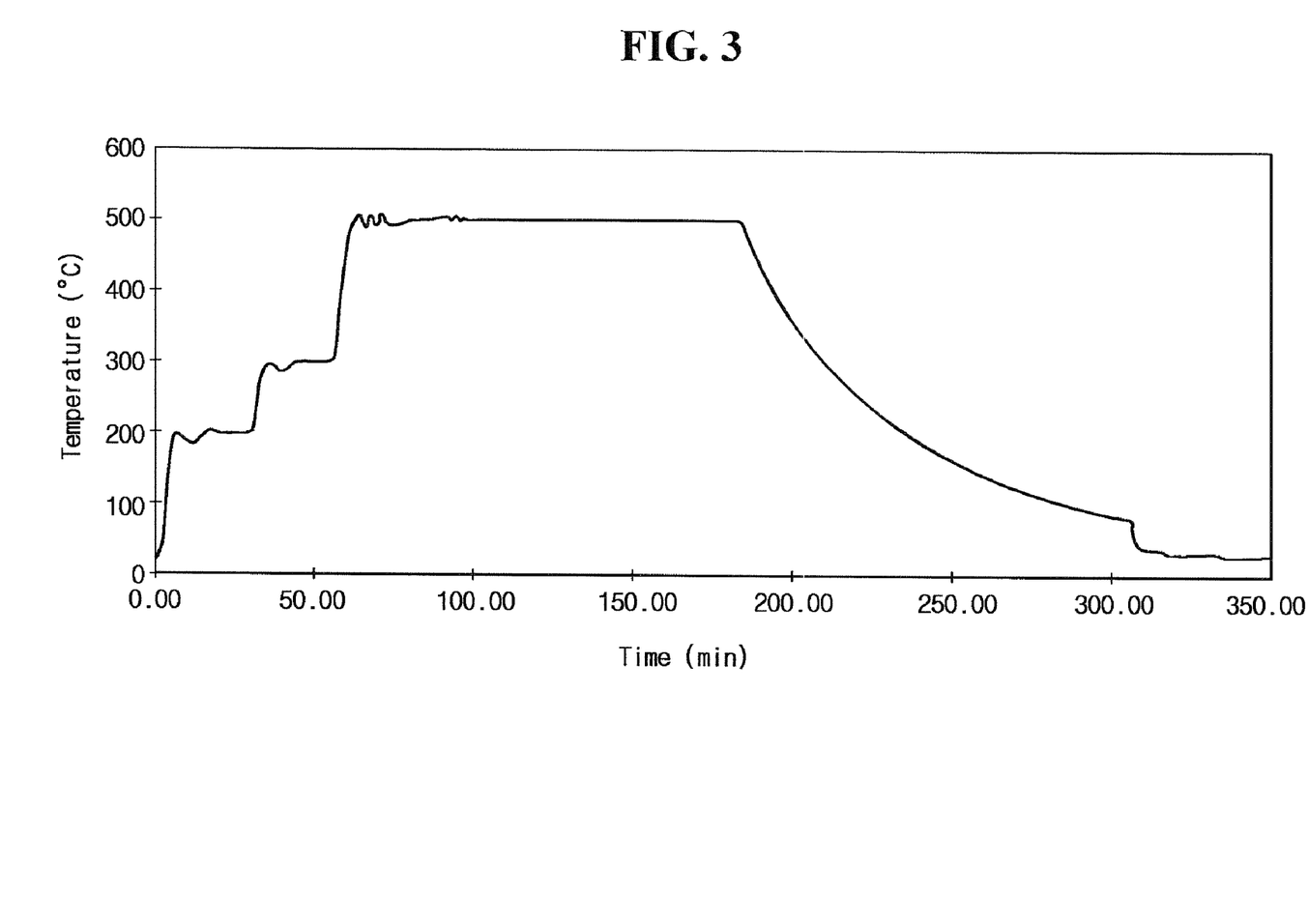
FIG. 3 shows a temperature profile during heat-treatment during preparation of the first carbon monoxide oxidizing catalyst.

The temperature of the heating may be varied between 200 to 500° C. An example of the temperature variance is illustrated in FIG. 3. Referring to FIG. 3, the heating is performed in three operations. The first operation is performed at 200° C., the second operation is performed at 300° C., and the third operation is performed at 550° C., for two hours.

The cerium precursor may comprise cerium nitrate, ammonium cerium nitrate, cerium acetate, cerium chloride, or mixtures thereof. According to one embodiment, $Ce(NO_3)_3$, $(NH_4)_2Ce(NO_3)_6$, or mixtures thereof may be used. The cerium precursor may include hydrates of the above compounds.

The M precursor may comprise M nitrate, M acetate, or M chloride, for example, nickel nitrate, cobalt nitrate, iron nitrate, $Ni(NO_3)_2$, $Ni(OCOCH_3)_2$, $NiCl_2$, $Co(NO_3)_2$, $Fe(NO_3)_3$, or mixtures thereof. The M precursor may comprise hydrates of the above compounds.

The Cu-comprising aqueous solution may be prepared by dissolving a copper precursor in water. Examples of the copper precursor may include copper nitrate, cooper acetate, and the like. Representative examples of the copper precursor include $Cu(NO_3)_2$, $Cu(NO_3)_2$, $Cu(NO_3)_2$, and $Cu(OCOCH_3)$. The copper precursor may include hydrates of the above compounds. The copper precursor may be dissolved in water according to a suitable concentration to form an aqueous copper-containing solution.

The carrier is selected from the group consisting of $Al_2O_3$, $TiO_2$, $SiO_2$, and combinations thereof. According to one embodiment, an $Al_2O_3$ carrier may be suitable.

According to an embodiment, the calcination is carried out by heating the compound to a temperature ranging from 450 to 550° C. When the temperature is lower than 450° C., the calcination is not performed completely. When the temperature exceeds 550° C., the porous structure of the first carbon monoxide oxidizing catalyst may be damaged. The calcination is carried out for 1 to 2 hours. When the heating is performed for less than 1 hour, the calcination is not performed completely. When it is performed more than 2 hours, the long processing is a waste of time and costs, which is undesirable.

The second carbon monoxide oxidizing catalyst may include any catalyst having an excellent activity for a carbon monoxide oxidizing reaction. For example, the second carbon monoxide oxidizing catalyst may include a Pt-group metal-based catalyst as an active material.

The Pt-group metal may be selected from the group consisting of Pt, Rh, Ru, and combinations thereof. According to one embodiment, Pt alone may be suitable.

The second carbon monoxide oxidizing catalyst may be an active material supported on at least one carrier. The carrier can be selected from the group consisting of graphite, denka black, ketjen black, acetylene black, carbon nanotubes, carbon nanofiber, carbon nanowire, carbon nanoballs, activated carbon, alumina, silica, zirconia, titania, and combinations thereof.

The first and second carbon monoxide oxidizing catalysts may be used in a volume ratio of 25:75 to a volume ratio of 75:25. According to one embodiment, the first and second carbon monoxide oxidizing catalysts may be used in a volume ratio of 50:50. When the volume ratio of the first carbon monoxide oxidizing catalyst is less than 25, desirable selectivity cannot be obtained, and a high concentration of an oxidant should be used. When the volume ratio of the second carbon monoxide oxidizing catalyst is less than 25, desirable activity cannot be obtained, and thereby the carbon monoxide concentration cannot be reduced to an intended level.

The carbon monoxide reducing part may include an inlet at one end, and an outlet at the other end. The first reducing part, including the first carbon monoxide oxidizing catalyst, is disposed at the inlet, and the second reducing part, including the second carbon monoxide oxidizing catalyst, is disposed at the outlet.

The supplied fuel reacts with the first carbon monoxide oxidizing catalyst, and then reacts with the second carbon monoxide oxidizing catalyst. Platinum-group catalysts have an increased activity for promoting a carbon monoxide oxidizing reaction as the ratio of an oxidant to carbon monoxide is increased. The first carbon monoxide oxidizing catalyst selectively promotes the oxidation of carbon monoxide over the oxidation of hydrogen. This reaction will increase the concentration of oxidant relative to carbon monoxide, because each molecule of oxidant ($O_2$) can oxidize two molecules of carbon monoxide. Therefore, as described above, when the fuel reacts with the first carbon monoxide oxidizing catalyst, and then sequentially reacts with the second carbon monoxide oxidizing catalyst, the ratio of the oxidant relative to the carbon monoxide of the inflow gas increases at the second carbon monoxide oxidizing catalyst. This higher ratio causes an increase in the catalytic activity of the second carbon monoxide oxidizing catalyst.

A fuel cell system according to one embodiment comprises: a reformer; at least one electricity generating element, for generating electrical energy by electrochemical reactions of the hydrogen gas and oxidant; a fuel supplier for supplying fuel to the reformer; and an oxidant supplier for supplying the oxidant to a carbon monoxide reducing part and the electricity generating element, respectively.

Hereinafter, the embodiments of the present invention will be described referring the accompanying drawings. However, the present invention is not limited to the embodiments.

Figure 1:
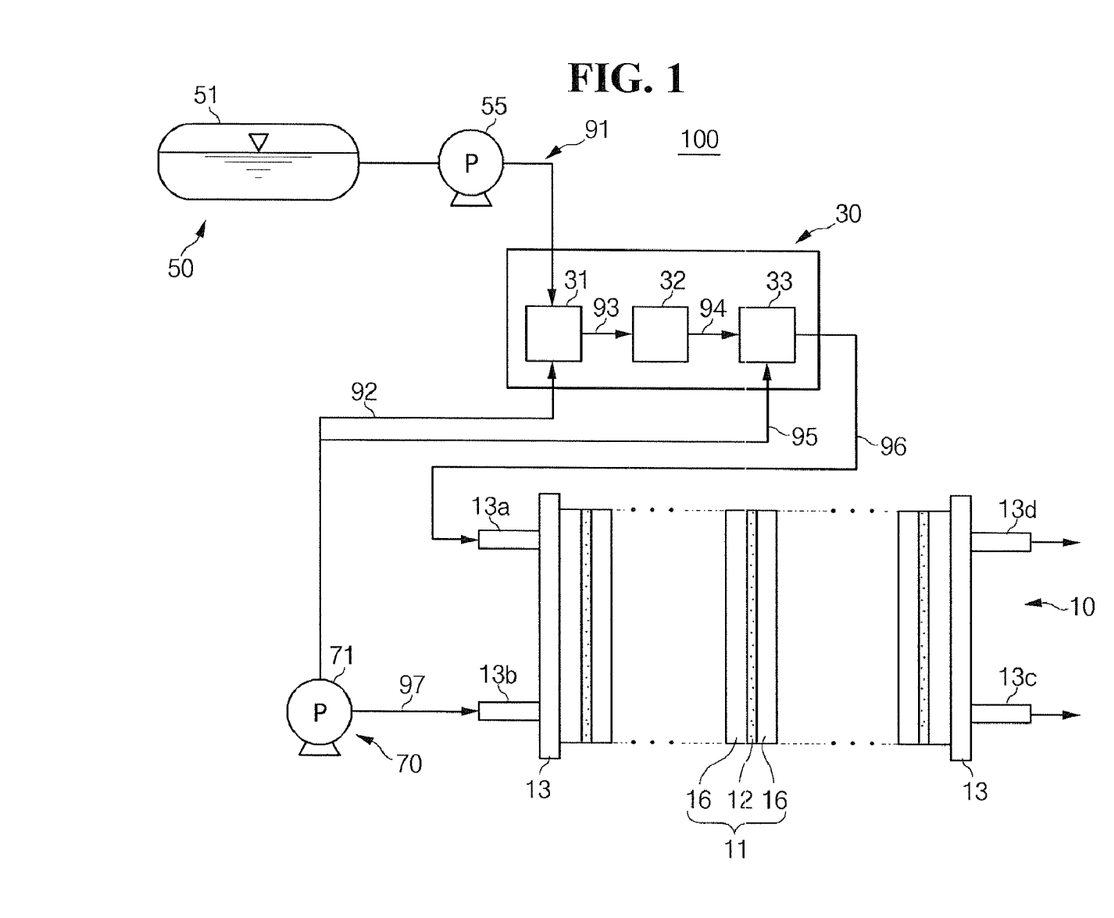
FIG. 1 is a schematic diagram showing the structure of a fuel cell system according to an embodiment of the present invention.

Hereinafter, a fuel cell system will be described referring to FIG. 1. FIG. 1 is a schematic diagram showing the structure of a fuel cell system.

As shown in FIG. 1, the fuel cell system 100 comprises: a stack 10, comprising an electricity generating element 11 that generates electrical energy through electrochemical reactions; a reformer 30 that generates hydrogen gas from a raw fuel; a fuel supplier 50 that supplies the raw fuel to the reformer 30; and an oxidant supplier 70 that supplies an oxidant to the reformer 30, and the electricity generating element 11.

The electricity generating element 11 is formed as a minimum unit for generating electricity. The minimum unit comprises a membrane-electrode assembly (MEA) 12 disposed between two separators 16. The stack 10 comprises a plurality of minimum units disposed in a stacked arrangement. The membrane-electrode assembly 12 includes an anode and a cathode, and performs hydrogen gas oxidation and oxidant reduction reactions. The separators 16 supply hydrogen gas and the oxidant through gas passage paths formed at both sides of the membrane-electrode assembly 12, and also function as conductors connecting the anode and the cathode, in series.

The stack 10 can additionally comprise pressing plates 13, to position a plurality of the electricity generating elements 11 closely adjacent to each other, at the outermost ends of the stack 10. However, the stack 10 of a fuel cell according to the present embodiment can be formed by positioning separators 16 at the outermost ends of the electricity generating elements 11, to press the electricity generating elements 11, instead of using the separate pressing plates 13. On the contrary, the pressing plates 13 can be formed to intrinsically function as the separators 16, in addition to closely arranging the plurality of electricity generating elements 11.

The pressing plates 13 comprise a first inlet 13a to supply hydrogen gas to the electricity generating elements 11, a second inlet 13b to supply an oxidant to the electricity generating elements 11 from the oxidant supplier 70, a first outlet 13c to release hydrogen gas remaining after a reaction at the anodes of the membrane-electrode assemblies 12, and a second outlet 13d to release non-reacted air, including moisture generated through a reduction reaction of the oxidant at the cathodes of the membrane-electrode assemblies 12. The oxidant may be air. When the oxidant is air, the air may be supplied through the oxidant supplier 70.

The reformer 30 has a structure for generating hydrogen gas from a fuel by chemical catalytic reactions using heat energy and for reducing carbon monoxide concentration in the hydrogen gas.

The reformer 30 comprises: a heating source 31 to generating heat energy through a catalytic oxidizing reaction of the fuel and the oxidant; a reforming reaction part 32 to generate hydrogen gas from the fuel, through a steam reforming (SR) catalyst reaction, by the heat energy; and a carbon monoxide reducing part 33 to reduce the concentration of carbon monoxide included in the hydrogen gas.

In the present embodiment, the reaction of the reformer 30 is not limited to the steam reforming catalyst reaction, and may comprise an auto-thermal reforming (ATR) reaction or a partial oxidation reaction (POX) performed without the use of the heating source 31.

The heating source 31 is connected to a fuel pump 55, through a first supply line 91 and is connected to an oxidant pump 71, through a second supply line 92. Supply lines as described herein, can be conduits having structures suitable for directing fluids, for example, a channel, a pipe, or a tube structure. The liquid fuel and oxidant pass through the heating source 31. The heating source 31 comprises a catalyst layer (not shown) to accelerate the oxidizing reaction of the fuel with the oxidant, to generate the heat energy. Herein, the heating source 31 is formed as a plate that provides a channel (not shown), capable of channeling the liquid fuel and the oxidant. The surface of the channel is coated with the catalyst layer. The heating source 31 is shaped as a cylinder that has a defined internal space. The internal space may be filled with a catalyst layer such as a pellet-type catalyst module, or a honeycomb-type catalyst module.

The reforming reaction part 32 absorbs the heat energy generated from the heating source 31 to generate the hydrogen gas through the steam-reforming catalyst reforming reaction of the fuel supplied from the fuel tank 51. The reforming reaction part 32 is directly connected to the heating source 31 via a third supply line 93. In addition, the reforming reaction part 32 comprises a catalyst layer (not shown) to accelerate the steam reforming reaction of the fuel into hydrogen.

The carbon monoxide reducing part 33 reduces the carbon monoxide concentration in the hydrogen gas through a preferential CO oxidation catalyzed reaction of the CO with air. The hydrogen gas is generated from the reformer reaction part 32 and the air is supplied from the oxidant pump 71. The carbon monoxide reducing part 33 is connected to the reformer reaction part 32 via a fourth supply line 94, and to the oxidant pump 71 via a fifth supply line 95. Thus, the hydrogen gas and the oxidant pass through the carbon monoxide reducing part 33.

The carbon monoxide reducing part 33 includes the first reducing part comprising the first carbon monoxide oxidizing catalyst and the second reducing part comprising the second carbon monoxide oxidizing catalyst. The first and second carbon monoxide oxidizing catalysts reduce the carbon monoxide concentration in the hydrogen gas by promoting a preferential oxidizing reaction of carbon monoxide with an oxidant. Herein, the carbon monoxide reducing part 33 comprises a plate-shaped channel (not shown) capable of inflowing the hydrogen gas and the oxidant. The surface of the channel is coated with the catalyst layer. The first carbon monoxide reducing catalyst can be located upstream from the second carbon monoxide reducing catalyst, relative to the flow of the hydrogen gas. The carbon monoxide reducing part 33 is shaped as a cylinder that has a defined internal space. The internal space may be filled with a catalyst layer such as a pellet-type catalyst module or a honeycomb-type catalyst module.

Herein, the carbon monoxide reducing part 33 is connected to the first inlet 13a of the stack 10, via a sixth supply line 96. The carbon monoxide reducing part 33 provides the electricity generating elements 11, of the stack 10, with the hydrogen gas having a reduced carbon monoxide concentration. In addition, the carbon monoxide reducing part 33 may comprise thermally conductive stainless steel, aluminum, copper, iron, and the like.

Figure 2:
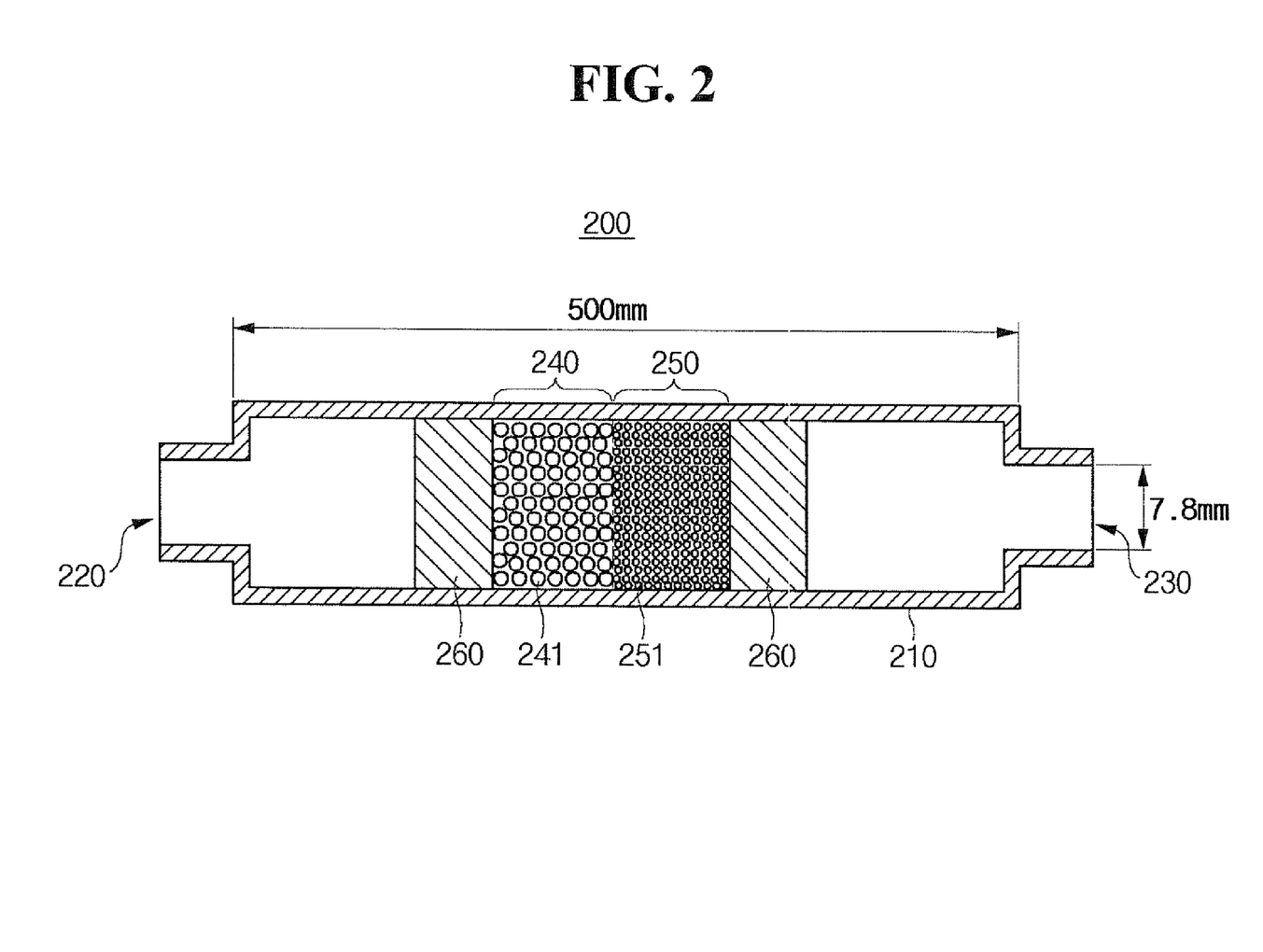
FIG. 2 is a cross sectional view showing the structure of a carbon monoxide reducing part according to one embodiment of the present invention.

FIG. 2 is a cross sectional view showing structure of a carbon monoxide reducing part 200.

Referring to FIG. 2, the carbon monoxide reducing part 200 can be fabricated as a pipe-shaped reactor 210 with a predetermined gas inlet 220 and gas outlet 230.

The carbon monoxide reducing part 200 includes a first carbon monoxide reducing part 240 including a first carbon monoxide oxidizing catalyst 241 preferentially oxidizing a carbon monoxide included in a gas and a second carbon monoxide reducing part 250 including a second carbon monoxide oxidizing catalyst 251 preferentially oxidizing a carbon monoxide included in the gas.

In addition, the carbon monoxide reducing part 200 can further include filters 260 positioned at the gas inlet 220 or the gas outlet 230. The filters 260 can be mesh in order to completely catch the first carbon monoxide oxidizing catalyst 241 or the second carbon monoxide oxidizing catalyst 251.

The first carbon monoxide reducing part 240 may partially take an internal space of the pipe-shaped reactor 210 from the gas inlet 220. The second carbon monoxide reducing part 250 may also partially take an internal space of the pipe-shaped reactor 210 from the first reducing part 240 to the gas outlet 230.

Accordingly, the gas including carbon monoxide and oxygen is injected through a gas inlet 220 to the pipe-shaped reactor 210, passes the first carbon monoxide reducing part 240 and thereafter the second carbon monoxide reducing part 250, and is released through a gas outlet 230 out of the pipe-shaped reactor 210.

The first carbon monoxide oxidizing catalyst 241 has higher selectivity for a carbon monoxide oxidizing reaction than the second carbon monoxide oxidizing catalyst 251, and the second carbon monoxide oxidizing catalyst 251 has higher activity for a carbon monoxide oxidizing reaction than the first carbon monoxide oxidizing catalyst 241.

The following examples illustrate the present invention in more detail. However, it is understood that the present invention is not limited by these examples.

Example 1

5.2981 g of $Ce(NO_3)_2.6H_2O$ was dissolved in 10 ml of a $Cu(NO_3)_2.3H_2O$ aqueous solution, to prepare a solution.

Then, 20 ml of $Al_2O_3$ (14.84 g) was added to the solution. The resulting solution was variably heated according to the temperatures as given in FIG. 3, while stirring. Then, the solution was evaporated to prepare a first carbon monoxide oxidizing catalyst. In the prepared first carbon monoxide oxidizing catalyst, CuO, $CeO_2$, and $Al_2O_3$ had a weight ratio of 4:21:74.9. A second carbon monoxide oxidizing catalyst comprising 0.12 wt % of $Pt/Al_2O_3$ (trade name: NEP-TM752) was provided.

A reactor comprising a carbon monoxide reducing part having an inlet, an outlet, and an interior channel connecting the inlet and the outlet, was provided. Next, 10 ml of the first carbon monoxide oxidizing catalyst was coated on the surface of the channel adjacent to the inlet, to form a first carbon monoxide reducing part. Likewise, 10 ml of the second carbon monoxide oxidizing catalyst was coated on the surface of the channel adjacent to the outlet, to form a second carbon monoxide reducing part. The first and second carbon monoxide oxidizing catalysts had a volume ratio of 50:50.

Example 2

A carbon monoxide reducing part was fabricated according to the same method as in Example 1, except that 5.2981 g of $Ce(NO_3)_2.6H_2O$ and 0.0386 g of $Ni(NO_3)_2.6H_2O$ were dissolved in 10 ml of a $Cu(NO_3)_2.3H_2O$ aqueous solution, to form the first carbon monoxide oxidizing catalyst. The first carbon monoxide oxidizing catalyst comprised NiO, CuO, $CeO_2$, and $Al_2O_3$, in a weight ratio of 0.1:4:21:74.9.

Comparative Example 1

A reactor comprising a carbon monoxide reducing part having an inlet, an outlet, and an interior channel connecting the inlet and the outlet, was provided. 0.12 wt % of $Pt/Al_2O_3$ (trade name: NEP-TM752) was coated on the surface of the channel. 20 ml of the $Pt/Al_2O_3$ catalyst was also loaded into the channel.

A gas comprising 14.66% $CO_2$, 39.97% $H_2$, 12.29% $N_2$, 0.33% $CH_4$, 0.31% CO, 0.25% $O_2$, and 32.19% $H_2O$, was flowed through the carbon monoxide reducing parts according to Examples 1, 2, and Comparative Example 1, at a flux of 1658.6667 ml/min, and a space velocity of 4976 $h^{-1}$.

The carbon monoxide reducing part according to Example 1 showed a carbon monoxide conversion rate of 98%, Example 2 showed a carbon monoxide conversion rate of 99%, and Comparative Example 1 showed a carbon monoxide conversion rate of 78%. The carbon monoxide reducing parts according to Examples 1 and 2, therefore, had higher carbon monoxide conversion rates than that of Comparative Example 1. At the inlet, the oxidant ratio relative to carbon monoxide ($O_2$/CO) was about 0.8 for Comparative Example 1. In comparison, the $O_2$/CO ratio was about 1.0, after reacting with the first carbon monoxide oxidizing catalyst, of Examples 1 and 2.

The reformer for a fuel cell has a simplified structure and excellent activity and selectivity for carbon monoxide oxidation. The reformer also has high selectivity at high temperatures even though a platinum-group catalyst is used. The reformer can reduce the carbon monoxide content to a ppm level.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A reformer for a fuel cell system, comprising:
   a reforming reaction part configured to generate a hydrogen gas from a fuel through a catalyst reforming reaction using heat energy; and
   a carbon monoxide reducing part configured to reduce the concentration of carbon monoxide in the hydrogen gas by reacting the carbon monoxide with an oxidant,
   wherein the carbon monoxide reducing part comprises a first carbon monoxide oxidizing catalyst comprising a first active material comprising $CeO_2$, CuO and MO, wherein the M is selected from the group consisting of Ni, Co, Fe, Sn, Pb, Se, and combinations thereof, and a second carbon monoxide oxidizing catalyst comprising a second active material selected from the group consisting of Pt, Rh, Ru, and combinations thereof.

2. The reformer of claim 1, wherein the first carbon monoxide oxidizing catalyst has a higher selectivity for oxidizing carbon monoxide than the second carbon monoxide oxidizing catalyst, and wherein the second carbon monoxide oxidizing catalyst has a higher carbon monoxide oxidizing activity than the first carbon monoxide oxidizing catalyst.

3. The reformer of claim 1, wherein the first carbon monoxide oxidizing catalyst comprises the $CeO_2$ and CuO in a weight ratio of 15-25:1-10.

4. The reformer of claim 1, wherein the first carbon monoxide oxidizing catalyst further comprises a carrier selected from the group consisting of $Al_2O_3$, $TiO_2$, $SiO_2$, and combinations thereof, to support the first active material.

5. The reformer of claim 1, wherein the M is Ni.

6. The reformer of claim 1, wherein the first carbon monoxide oxidizing catalyst comprises the $CeO_2$, MO, and CuO in a weight ratio of 15-25:0.1-0.4:1-10.

7. The reformer of claim 1, wherein the first carbon monoxide oxidizing catalyst further comprises a carrier selected from the group consisting of $Al_2O_3$, $TiO_2$, $SiO_2$, and combinations thereof, to support the first active material.

8. The reformer of claim 1, wherein the second carbon monoxide oxidizing catalyst further comprises at least one carrier selected from the group consisting of graphite, denka black, ketjen black, acetylene black, carbon nanotubes, carbon nanofiber, carbon nanowire, carbon nanoballs, activated carbon, alumina, silica, zirconia, titania, and combinations thereof, to support the second active material.

9. The reformer of claim 1, wherein the first carbon monoxide oxidizing catalyst and the second carbon monoxide oxidizing catalyst are included in a volume ratio of 25:75 to 75:25.

10. A fuel cell system, comprising:
    a reformer comprising a reforming reaction part that generates hydrogen gas from a fuel through a catalyst reforming reaction using heat energy and a carbon monoxide reducing part configured to reduce the concentration of carbon monoxide concentration in the hydrogen gas by reacting the carbon dioxide with an oxidant, wherein the carbon monoxide reducing part comprises a first carbon monoxide oxidizing catalyst comprising a first active material comprising $CeO_2$, CuO and MO, wherein the M is selected from the group consisting of Ni, Co, Fe, Sn, Pb, Se, and combinations thereof, and a second carbon monoxide oxidizing catalyst comprising a second active material selected from the group consisting of Pt, Rh, Ru, and combinations thereof;
    an electricity generating element;
    a fuel supplier configured to supply the fuel to the reforming reaction part; and an oxidant supplier configured to supply the oxidant to the carbon monoxide reducing part and the electricity generating element.

11. The fuel cell system of claim 10, wherein the first carbon monoxide oxidizing catalyst has higher selectivity for a carbon monoxide oxidizing reaction than the second carbon monoxide oxidizing catalyst, and wherein the second carbon monoxide oxidizing catalyst has higher activity for a carbon monoxide oxidizing reaction than the first carbon monoxide oxidizing catalyst.

12. The fuel cell system of claim 10, wherein the first carbon monoxide oxidizing catalyst comprises the $CeO_2$ and CuO in a weight ratio of 15-25:1-10.

13. The fuel cell system of claim 10, wherein the first carbon monoxide oxidizing catalyst further comprises a carrier selected from the group consisting of $Al_2O_3$, $TiO_2$, $SiO_2$, and combinations thereof, to support the first active material.

14. The fuel cell system of claim 10, wherein the M is Ni.

15. The fuel cell system of claim 10, wherein the first carbon monoxide oxidizing catalyst comprises the $CeO_2$, MO, and CuO in a weight ratio of 15-25:0.1-0.4:1-10.

16. The fuel cell system of claim 10, wherein the first carbon monoxide oxidizing catalyst further comprises a carrier selected from the group consisting of $Al_2O_3$, $TiO_2$, $SiO_2$, and combinations thereof, to support the first active material.

17. The fuel cell system of claim 10, wherein the second carbon monoxide oxidizing catalyst further comprises at least one carrier selected from the group consisting of graphite, denka black, ketjen black, acetylene black, carbon nanotubes, carbon nanofiber, carbon nanowire, carbon nanoballs, activated carbon, alumina, silica, zirconia, titania, and combinations thereof, to support the second active material.

18. The fuel cell system of claim 10, wherein the first carbon monoxide oxidizing catalyst and the second carbon monoxide oxidizing catalyst are included in a volume ratio of 25:75 to 75:25.

19. An apparatus for supplying hydrogen to a fuel cell, comprising:
a reformer comprising a heating source;
a reforming reaction part configured to generate hydrogen from a fuel; and
a carbon monoxide reducing part configured to reduce the concentration of carbon monoxide in the hydrogen as the hydrogen flows there through,
wherein the carbon dioxide reducing part comprises a first carbon monoxide oxidizing catalyst comprising $CeO_2$, CuO and MO, wherein the M is selected from the group consisting of Ni, Co, Fe, Sn, Pb, Se, and combinations thereof, and a second carbon monoxide oxidizing catalyst selected from the group consisting of Pt, Rh, Ru, and combinations thereof, and
wherein the first carbon monoxide catalyst is disposed upstream from the second carbon monoxide reducing catalyst relative to the flow of the hydrogen through the carbon monoxide reducing part.

20. The apparatus of claim 19, wherein the first carbon monoxide oxidizing catalyst comprises a carrier selected from the group consisting of $Al_2O_3$, $TiO_2$, $SiO_2$, and combinations thereof.

21. The apparatus of claim 19, wherein the first carbon monoxide oxidizing catalyst and the second carbon monoxide oxidizing catalyst are included in a volume ratio of 25:75 to 75:25.

* * * * *